United States Patent [19]

Kelbel et al.

[11] 3,916,718
[45] Nov. 4, 1975

[54] TRANSMISSION CONTROL

[75] Inventors: Donald W. Kelbel; John W. Holdeman, Muncie, Ind.

[73] Assignee: Borg-Warner Corporation, Chicago, Ill.

[22] Filed: May 24, 1974

[21] Appl. No.: 473,026

Related U.S. Application Data

[63] Continuation-in-part of Ser. No. 441,679, Feb. 11, 1974.

[52] U.S. Cl. ................ 74/471 R; 74/473 R; 74/491
[51] Int. Cl.² .......................................... G05G 9/12
[58] Field of Search ....... 74/471 R, 471 XY, 473 R, 74/473 P, 475, 476, 477, 491

[56] References Cited
UNITED STATES PATENTS

| | | | |
|---|---|---|---|
| 1,970,690 | 8/1934 | Churchill | 74/743 |
| 2,057,073 | 10/1936 | Vandervoort | 74/473 X |
| 2,115,390 | 4/1938 | Lasley et al. | 74/473 |
| 2,310,310 | 2/1943 | Peterson et al. | 74/473 X |
| 2,839,083 | 6/1958 | Moen | 74/471 X |
| 3,422,697 | 1/1969 | Brown et al. | 74/473 P |

Primary Examiner—Allan D. Herrmann
Attorney, Agent, or Firm—J. Schachner

[57] ABSTRACT

A multiple speed sliding gear transmission is characterized by the provision of shift rails interconnected by linkage for effecting rotary and longitudinal movement of one in response to opposite movement of the other. The linkage provides a mechanical advantage in effecting both rotary and longitudinal movement and is curved or wrapped around an associated power shaft, thereby allowing compact placement of the shift rails adjacent to the power shaft within a transmission housing. The transmission is further characterized by the provision of a shift tower having a shift control lever connected to one shift rail for rotational movement thereof about the axis of the shift rail, and the provision of a floating pivot about which the shift control lever rotates on an axis spaced from the shift rail so as to provide longitudinal movement thereof. Further, the shift tower and its associated elements are easily assembled, and in particular provide a shift control lever in the form of a sub-assembly which may be inserted into the shift control tower by an easy snap-in movement.

17 Claims, 9 Drawing Figures

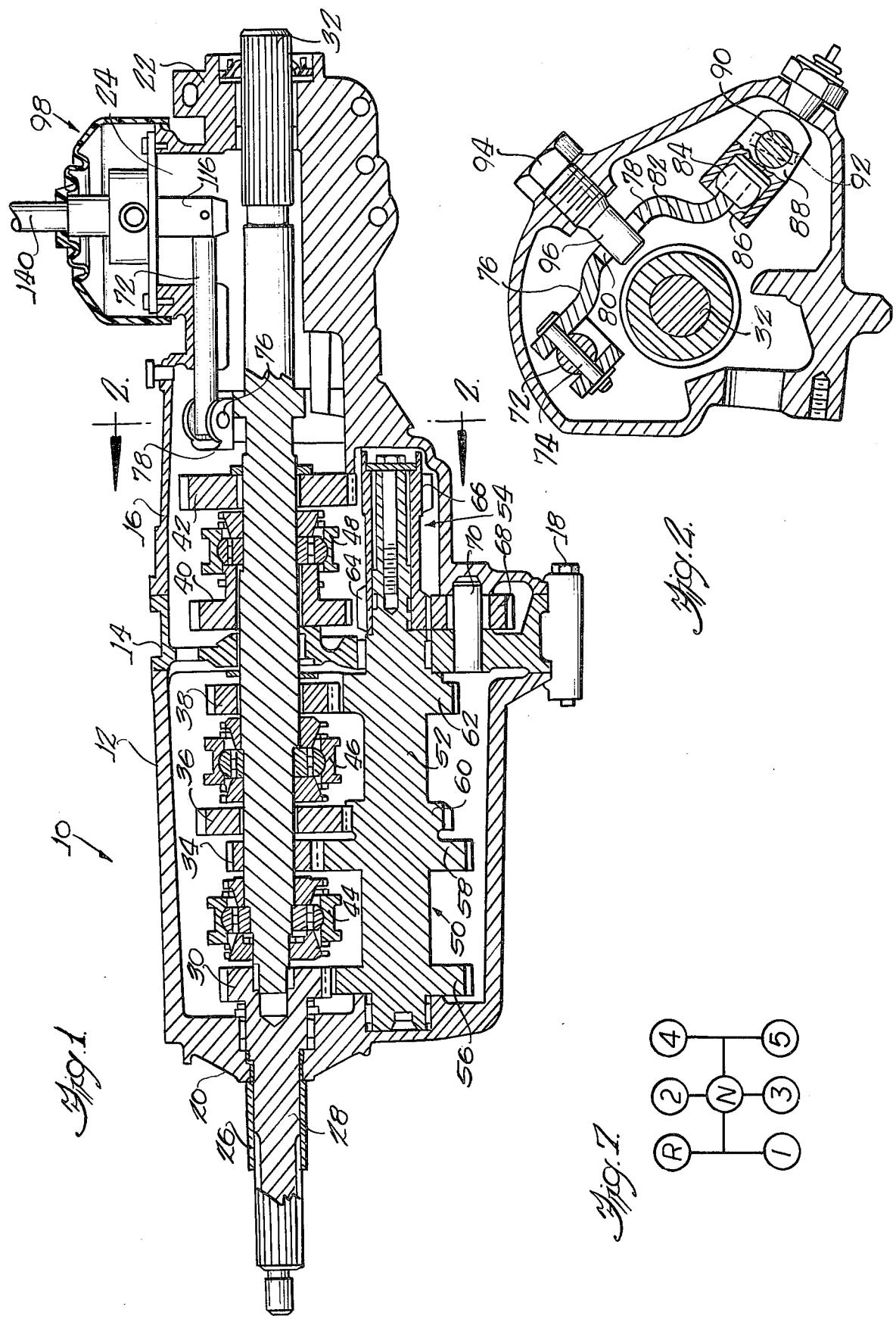

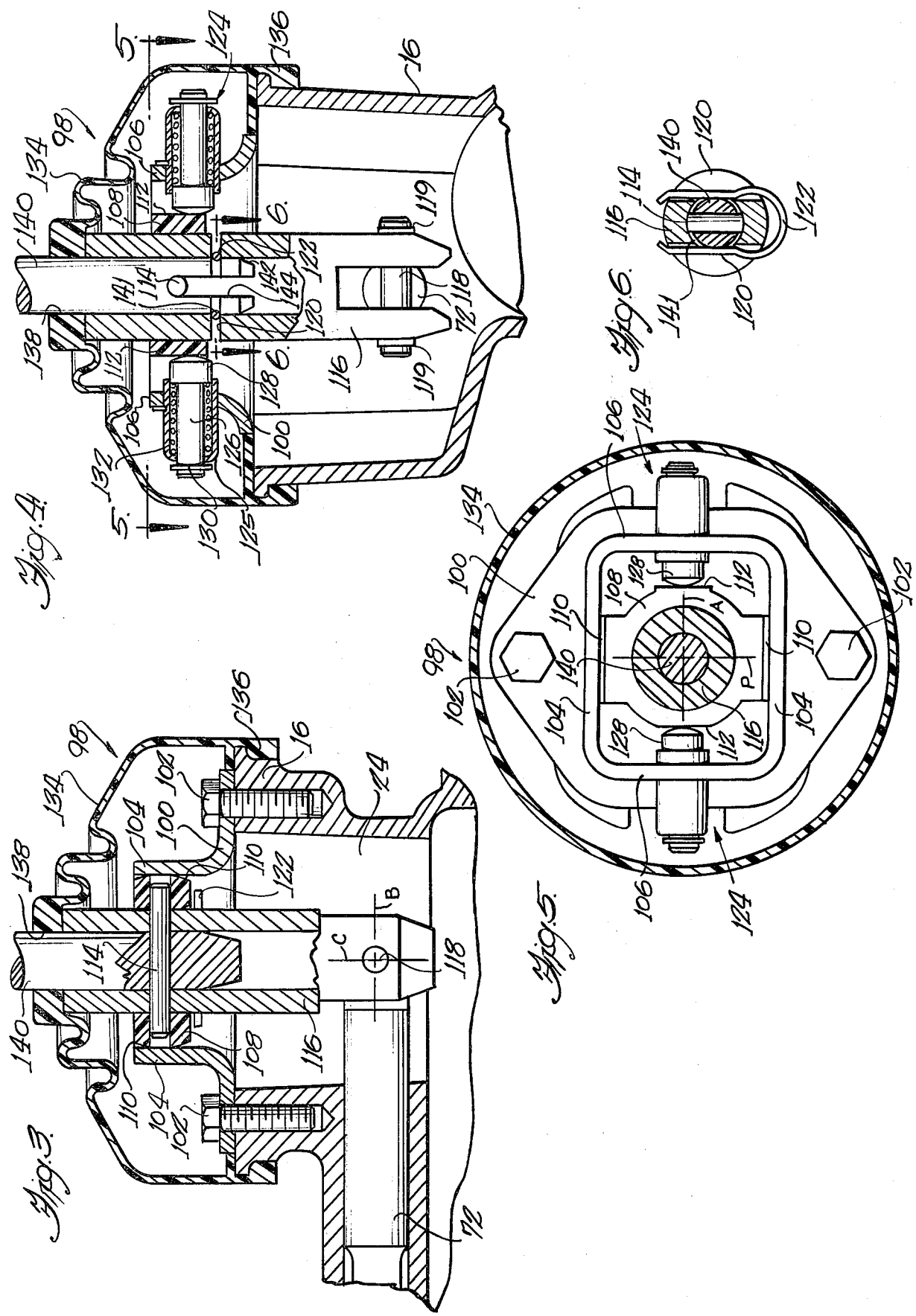

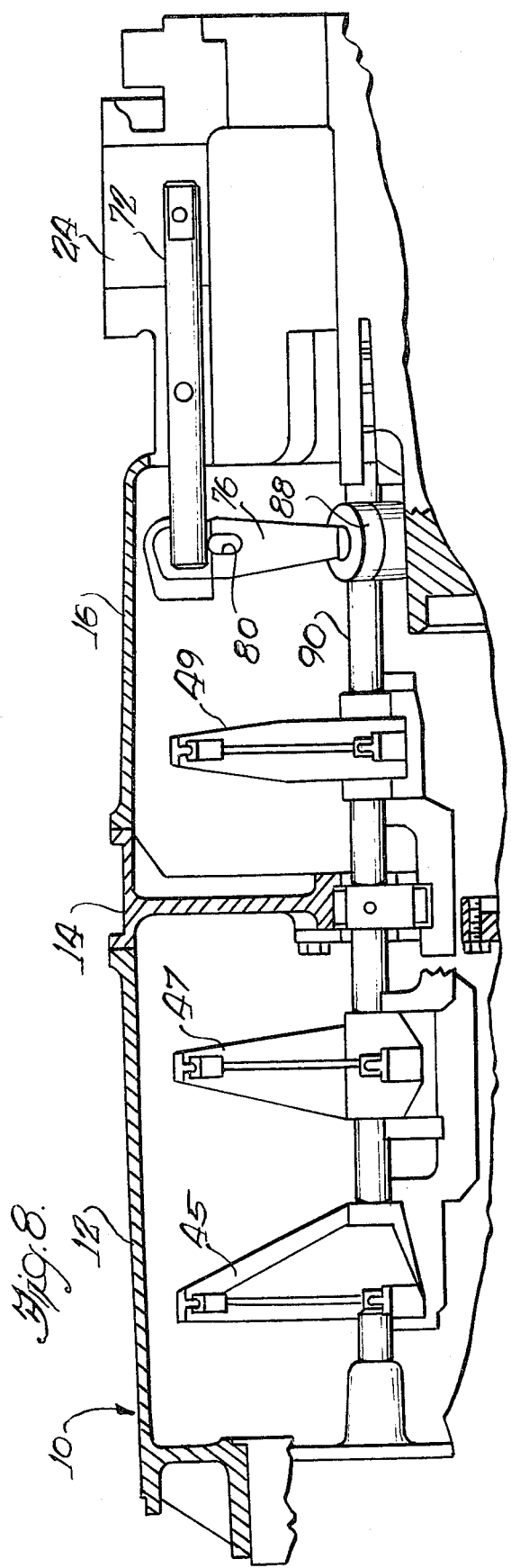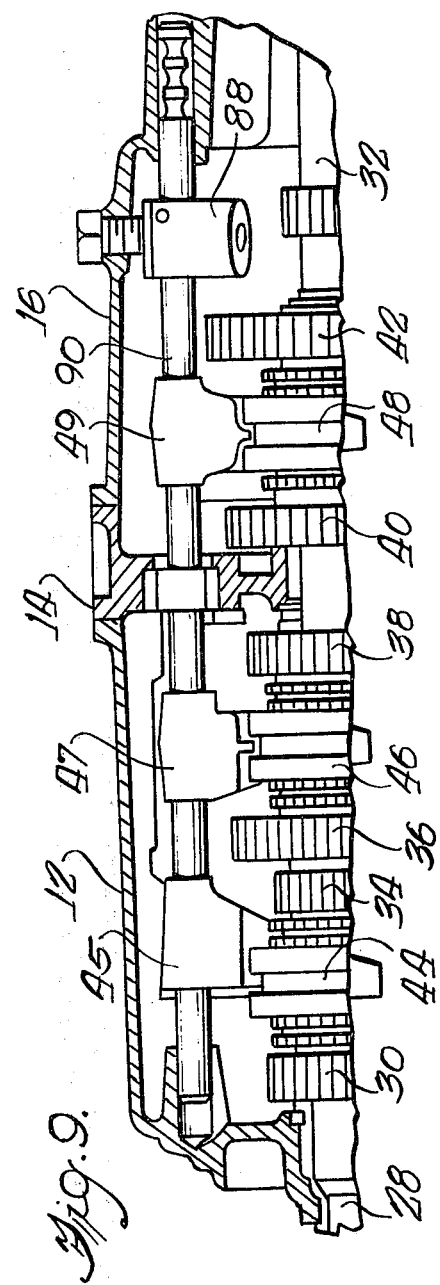

TRANSMISSION CONTROL

CROSS REFERENCE TO RELATED APPLICATIONS

This application is a continuation-in-part of our application Ser. No. 441,679, filed Feb. 11, 1974.

BACKGROUND OF THE INVENTION

1. Field of the Invention

This invention relates generally to automotive transmissions or the like and more particularly to a sliding gear manual transmission incorporating improved shift linkage and control mechanisms.

2. Description of the Prior Art

In recent years there have been many improvements in automotive transmissions, including improvements related to shifting of sliding gear manual transmissions. However, there is a need to provide a simplified system of shift linkage and control so as to establish desirable shifting movement with economical shift elements which exhibit reliability in service, and which are easy and simple to assembly within a relatively compact transmission housing.

Some prior attempts to meet this need have resulted in transmission controls which are difficult to assemble, or which surround an associated power shaft thereby requiring enlarged or elongated transmission housings. Other prior attempts to form controls in the form of sub-assemblies have added to the bulk of the overall transmission.

SUMMARY OF THE INVENTION

An object of this invention is to meet the continuing need and desire in the art for improvements in transmissions by providing a multiple speed sliding gear manual transmission shift control assembly including a shift tower easily joined to the transmission housing. The shift tower provides two pivots, one of which is floating. A shift lever sub-assembly may be easily joined to the tower on the transmission housing by a simple snap-in operation.

A related object of this invention is to provide shift rail control linkage which gives a mechanical advantage in effecting both rotary and longitudinal movement of one shift rail in response to movement of the other shift rail, and in addition allows for compact placement of the rails adjacent a power shaft within the transmission housing so as to reduce the overall size of the transmission.

BRIEF DESCRIPTION OF THE DRAWINGS

FIG. 1 is a sectional view of a five-speed transmission embodying the invention;

FIG. 2 is a partial sectional view taken along the line 2—2 of FIG. 1 showing details of the rail control linkage;

FIG. 3 is a detailed side view partially in section showing details of the shift control tower and its associated control linkage;

FIG. 4 is a detailed end view partially in section showing details of the shift control tower and its associated control linkage;

FIG. 5 is a top view taken along the lines 5—5 of FIG. 4 showing details of the shift control tower and its associated linkage;

FIG. 6 is a detailed view of the snap locking mechanism for securing the shift lever to the sleeve within the shift control tower;

FIG. 7 is a diagramatic view showing the shift pattern established according to this invention;

FIG. 8 is a partial sectional view, similar to FIG. 1, partially cut away to show details of the shift rails and shift forks; and FIG. 9 is a partial sectional bottom view of the transmission of FIG. 1, partly cut away to show details of the lower shift rail, shift forks, and synchronizing clutch mechanisms.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, a multiple speed transmission 10 is of the type disclosed in copending application Ser. No. 441,679, filed Feb. 11, 1974. Transmission 10 includes a front housing section 12, an intermediate housing section 14 and a rear housing section 16. These sections are preferably die cast aluminum, and are suitably secured together by a plurality of bolts 18 to form a complete housing. Front housing section 12 defines a forward wall 20, and rear housing section 16 defines a rearward wall 22 and an upwardly directed tower opening 24.

A support sleeve 26 of steel extends through a bore defined by forward wall 20 into the interior of the housing, and at several points is crimped against the interior surface of forward wall 20. Details of the structural relationship of sleeve 26 and forward wall 20 are more fully disclosed in the aforementioned application Ser. No. 441,679. Sleeve 26 provides support for transmission 10 during assembly, shipping and installation in an associated vehicle. A snug fit ensures that the sleeve is capable of taking abuse during handling, and still providing an aligned mount for an associated clutch release bearing.

It has been found that such a sleeve crimped to the forward wall of a transmission housing provides surprising strength. Sleeve 26 is capable of supporting unbalanced side loads in addition to the associated clutch release bearing and its related mechanisms. Side loads of 1,000 pounds have been supported by such a sleeve. Thus, it should be clear that in handling, and assembling transmission 10 into an automotive vehicle or the like, sleeve 26 may be used in supporting and carrying transmission 10 without imparing its usefulness as a mount.

An input shaft 28 extends coaxially through sleeve 26 into transmission 10 and defines therein an input gear 30. Input shaft 28 is journalled for rotation in forward wall 20 of housing section 12. A suitable seal is provided between forward wall 20 and input shaft 28.

An output shaft 32 is journalled for rotation in input shaft 28, housing section 14 and rearward wall 22 of housing section 16. A suitable seal is provided between rearward wall 22 and output shaft 32. A plurality of spaced output gears 34, 36, 38, 40 and 42 are carried by output shaft 32.

A fourth-fifth ratio synchronizing clutch mechanism 44 is located between input gear 30 and fifth ratio output gear 34. A second-third ratio synchronizing clutch mechanism 46 is located between second ratio output gear 36 and third ratio output gear 38. Similarly, a reverse-first ratio synchronizing clutch mechanism 48 is located between reverse ratio output gear 40 and first ratio output gear 42. Synchronizing clutch mechanisms 44, 46 and 48 may be of the type disclosed in White et al. U.S. Pat. No. 2,221,900, issued Nov. 19, 1940.

Clutch mechanism 44 is moved forwardly to provide fourth or direct ratio directly engaging input gear 30 with output shaft 32, and is moved rearwardly to engage output gear 34 in fifth or overdrive ratio. Clutch mechanism 46 is moved forwardly to engage output gear 36 in second ratio and rearwardly to engage output gear 38 in third ratio. Similarly, clutch mechanism 48 is moved forwardly to engage output gear 40 in reverse ratio and rearwardly to engage output gear 42 in first ratio.

It should be understood that the transmission disclosed herein is one embodiment of the invention and that alternative embodiments in various forms including three, four or five-speed arrangements, for example, would be suitable. A five-speed transmission with direct drive in fifth ratio is one of the embodiments contemplated.

A cluster gear 50 includes a countershaft 52 journalled for rotation in housing sections 12 and 14. Cluster gear 50 also includes a countershaft extension assembly 54 extending rearwardly from countershaft 52 and journalled in housing section 16. Countershaft extension assembly 54 and its relationship to countershaft 52 are disclosed in detail in the aforementioned application Ser. No. 441,679. Briefly, countershaft extension assembly 54 is movable relative to countershaft 52 so as to compensate for any misalignment of the bearings in which cluster gear 50 is journalled.

Countershaft 52 defines a drive gear 56 meshing with input gear 30 to provide continuous drive therefor. Countershaft 52 also defines a fifth ratio input gear 58, a second ratio input gear 60 and a third ratio input gear 62. These input gears mesh with fifth ratio output gear 34, second ratio output gear 36 and third ratio output gear 38, respectively.

Countershaft extension assembly 54 defines gears 64 and 66. Reverse input gear 64 drives reverse output gear 40 through an intermediate gear 68 carried by a reverse countershaft 70, which in turn is supported by housing sections 14 and 16. First ratio input gear 66 meshes with first ratio output gear 42.

The transmission itself is shown in one preferred form wherein first gear may provide a reduction of 3.41, second gear a reduction of 2.08, third gear a reduction of 1.40, fourth gear direct drive and fifth gear overdrive with a ratio of 0.80. The reduction in reverse gear is 3.36. It should be understood, however, that various other ratios may be provided as desired. For example, with minimum changes fourth gear may provide a suitable reduction and fifth gear may provide direct drive. It should also be apparent that although the invention provides a novel arrangement for a five-speed sliding gear transmission, it is readily convertable for use with three or four speed or other sliding gear transmission assemblies with or without overdrive.

An important feature of this improved transmission is the provision of a desirable, convenient shift pattern as shown diagramatically in FIG. 7. This pattern includes a leftward reverse-first position, a central second-third position and a rightward fourth-fifth position as viewed from the operator's station. To achieve this pattern, it was necessary to arrange the various gear sets as shown herein. The pattern is accomplished by providing that clutch mechanism 44 move forwardly to establish fourth ratio and rearwardly to establish fifth ratio; that clutch mechanism 46 move forwardly to establish second ratio and rearwardly to establish third ratio; and that clutch mechanism 48 move forwardly to establish reverse ratio and rearwardly to establish first ratio.

To achieve the pattern within a very compact transmission housing, it was necessary to provide upper and lower shift rails which move in opposite directions, as disclosed in detail in the aforementioned applications Ser. No. 441,679. Briefly, an upper shift rail 72 is suitably supported in housing section 16 for both rotary and axial motion. Upper shift rail 72 is loosely connected by means of an appropriate pivot pin 74 with a lever 76. Lever 76 has an offset central portion 78 of bifurcated configuration thereby defining a slot 80. Lower portion 82 of lever 76 supports a spherical ball 84, which in a preferred form may be a pair of hemispherical elements snapped into position. Spherical ball 84 is frictionally accommodated in a socket 86 formed at one end of the link member 88. Link member 88 is secured to a lower shift rail 90 by means of a suitable pin 92.

A bolt 94 is threaded into housing section 16 and extends into the interior thereof. Bolt 94 has an extension in the form of a stud 96 extending through slot 80 of bifurcated central portion 78. Stud 96 serves as a guide along which lever 76 slides upon rotation of upper shift rail 72, thereby causing rotation of lower shift rail 90 in a direction opposite to that of upper shift rail 76. The relative effective lengths of lever 76 and link member 88 determine the mechanical advantage obtained.

Stud 96 also serves as a fulcrum about which lever 76 pivots upon longitudinal movement of upper shift rail 72, thereby causing an opposite longitudinal movement of lower shift rail 90. The mechanical advantage of this arrangement is determined by the relative effective lengths of the upper and lower portions of lever 76, which is established according to the placement of bolt 94.

Rotation of upper shift rail 72 causes an opposite rotation of lower shift rail 90, thereby selectively engaging one of shift forks 45, 47 and 49. The shift forks are engaged in a conventional manner with synchronizing clutch mechanisms 44, 46 and 48, respectively. Subsequent longitudinal movement of upper shift rail 72 causes an opposite longitudinal movement of lower shift rail 90. As a result, the selectively engaged shift fork moves its associated synchronizing clutch mechanisms to establish the desired gear ratio.

As most clearly shown in FIGS. 3, 4, 5 and 6, a shift control tower 98 is supported by rear housing section 16 over tower opening 24. Tower 98 includes a support frame 100 secured to rear housing section 16 by suitable bolts 102. Frame 100 is centered above tower opening 24 and defines spaced front and rear guides 104 oriented perpendicular to the longitudinal axis of upper shift rail 72. Frame 100 defines spaced side guides 106 oriented parallel to the longitudinal axis of upper shift rail 72. Guides 104 and 106 are engaged by a floating fulcrum in the form of a bushing or support 108 which, in a preferred form of the invention, is formed from nylon or a similar material. Use of such a material will reduce wear and provide relatively low friction shifting as well as relatively low noise levels.

Fulcrum support 108 defines a pair of rounded front and rear surfaces 110 frictionally engaging guides 104. Similarly, fulcrum support 108 defines a pair of flat side surfaces 112 which are spaced from side guides 106.

A cross pin 114 is carried by support 108 and is oriented longitudinally parallel to the axis of upper shift rail 72. Support 108 also carries a cylindrical shaft 116 extending therethrough and downwardly into tower opening 24. Shaft 116 is secured to support 108 by cross pin 114. The lower portion of shaft 116 is secured to upper shaft rail 72 by a suitable pivot pin 118, to which it in turn is secured by suitable snap rings 119. The upper portion of shaft 116 defines a bore, and at a point just below support 108 shaft 116 defines a pair of longitudinally oriented slots 120. A spring clip 122 is carried by shaft 116 in slots 120 and has arms extending partially into the bore.

A pair of spring units 124 may be preassembled and mounted as sub-assemblies in side guides 106 of frame 100. Each spring unit 124 includes a U-shaped housing 125 within which a rod 126 is slidably received. Rod 126 defines a piston 128 extending outwardly from housing 125 at one end thereof, and extends through the other end of housing 125. Rod 126 is slidably secured by a suitable washer 130 which acts as a limit stop for movement of rod 126 relative to housing 125. A suitable spring 132 is located within housing 125 and biases piston 128 outwardly of housing 125.

Spring units 124 are carried by side guides 106 of frame 100 so that pistons 128 extend inwardly thereof to be engaged by side faces 112 of support 108 when in a central position in tower opening 24.

For ease of assembly, shaft 116 is extended downwardly into tower opening 24 into engagement with upper shift rail 72. Shaft 116 is locked into position by pivot pin 118 and snap rings 119. Spring units 124 are secured to frame 100, which is then secured to rear housing section 16 by bolts 102.

A protective boot 134 of rubber or other suitable material defines a flange 136 and an opening 138. Boot 134 is placed in position over tower opening 24 and held in position by flange 136. The shift control tower is now partially assembled to transmission 10 and may be installed in a vehicle.

Control stick 140 defines a notch 141 and a tapered end 142. Stick 140 also defines a slot 144 extending inwardly from tapered end 142.

For final assembly, control stick 140 is inserted through central opening 138 of boot 134 into the bore of shaft 116. Tapered end 142 spreads the arms of spring clips 122, and further movement of stick 140 will cause spring clip 122 to engage stick 140 in notches 141 defined therein. Slot 144 is provided to allow stick 140 to slip over cross pin 114 and into its locked position.

Guides 104 and spring units 124 serve to center support 108 and associated shafts 116 and control lever 140 within frame 100.

As control lever 140 is moved from side to side as shown in FIGS. 4 and 5, along a first axis A, support 108 slides along side guides 104 and against one or the other of spring units 124. Shaft 116 thereby is caused to pivot at pin 118 about the axis of upper shift rail 72, a second axis B, thereby rotating uppper shift rail 72. As set forth hereinbefore, rotation of upper shift rail 72 causes a counter rotation of lower shift rail 90 through force multiplying lever 76. This rotation results in crossover selection to the left or right in the neutral position shown in FIG. 7, as desired.

Movement of control lever 140 from side to side as shown in FIG. 3, that is in plane P as shown in FIG. 5, causes the center of motion to shift to the center of support 108, which may be at cross pin 114. Support 108 rotates in plane P within frame 100, as curved surfaces 110 slide relative to guides 104 of frame 100. This shifts the pivot point of shaft 116 to the center of support 108. As there is a pivotal link at pin 118, upper shift rail 72 is moved longitudinally. Longitudinal movement of upper shift rail 72 is transmitted with a mechanical advantage as an opposite longitudinal movement of lower shift rail 90 to engage one of the gear ratios as diagrammed in FIG. 7.

Support 108 is free to move vertically along a axis C within frame 100 to a limited extent, so as to allow pin 118 to be carried longitudinally with upper shift rail 72.

Thus it becomes apparent that in order to cause rotary movement of upper shift rail 72, shaft 116 pivots about rail 72 as support 108 is guided by front and rear guides 104 in side to side movement against spring units 124. In order to cause longitudinal movement of upper shift rail 72, support 108 rotates and serves as a floating fulcrum point about which shaft 116 also rotates. Support 108 slides vertically within frame 100 as necessary to allow movement of shaft 72.

This shift control tower assembly is formed as a group of sub-assemblies which may in turn be mounted within the transmission so as to simplify and reduce the cost of the finished product. As a final assembly step, a control stick may be pushed into place from the interior of a vehicle.

The shift control tower and linkage assemblies and sub-assemblies disclosed herein constitute a preferred embodiment of the invention. This should be considered as illustrative and may be modified by those skilled in the art without departing from the scope thereof, which is to be limited only by the claims herein.

We claim:

1. In a transmission, a housing, input and output shafts respectively journalled in said housing, said input shaft defining an input gear, at least one ratio output gear rotatably supported on said output shaft, a cluster gear assembly journaled in said housing and defining a drive gear meshing with said input gear and at least one ratio input gear in meshing relationship with said ratio output gear, means supported by said output shaft and axially movable for clutching said ratio output gear to said output shaft, first and second shift rails supported adjacent said output shaft in said housing for rotational and axial movement, said clutching means being engageable by said second shift rail upon rotational movement thereof and being axially movable thereby upon axial movement thereof for said clutching, and linkage means extending about said output shaft and connecting said shift rails for effecting movement of said second shift rail in response to movement of said first shift rail.

2. The invention according to claim 1, said linkage means including first and second links respectively connected to and movable with said first and second shift rails, said second link being frictionally engaged by said first link for rotational movement thereby, whereby rotational movement of said first shift rail in one direction causes rotational movement of said second shift rail in the opposite direction.

3. The invention according to claim 1, said linkage means including first and second links respectively connected to and movable with said first and second shift rails, said first link curving partially around said output shaft and engaging said second link for axial movement thereof, a fulcrum supported by said housing and engageable by said first link between said first shift rail and said second link, whereby axial movement of said first shift rail in one direction causes pivotal movement of said first link about said fulcrum, thereby causing axial movement of said second shift rail in the opposite direction.

4. In combination, a housing, first and second spaced rails supported in said housing for rotational and axial movement, first and second link members, a pivot pin securing said first link member to said first rail for movement therewith, said second link member secured to said second rail for movement therewith, said first and second link members defining a ball and socket forming a friction connection, a fulcrum supported in said housing and engageable by said first link member between said pivot pin and friction connection upon axial movement of said first link member, whereby rotational movement of said first rail and first link member is transmitted through said friction connection resulting in opposite rotational movement of said second link member and second rail, and whereby axial movement of said first rail causes pivotal movement of said first link member about said fulcrum resulting in opposite axial movement of said second link member and second rail, and means supported by said housing for selectively effecting rotational and axial movement of said first rail.

5. The invention according to claim 4, said first link member defining a slot therethrough, said fulcrum extending through said slot, said first link member being slidable along said fulcrum during rotational movement of said first rail and being pivotal about said fulcrum during axial movement of said first rail.

6. In a transmission, a housing, an input shaft journalled in said housing and defining input gear means, an output shaft journalled in said housing, ratio output gear means rotatably supported by said output shaft, a countershaft journalled in said housing and defining drive gear means in meshing relationship with said input gear means and defining ratio input gear means in meshing relationship with said ratio output gear means, synchronizer means supported by said output shaft and movable for selectively clutching said ratio output gear means to said output shaft for selectively effecting a drive ratio, a pair of shift rails in said housing linked together for opposite rotational and axial movement and connected to said synchronizer means, whereby rotational movement of said shift rails selectively engages said synchronizer means and axial movement of said shift rails effects said clutching, and means for effecting rotational and axial movement of said shift rails.

7. The invention according to claim 6, said movement effecting means including a frame supported by said housing and defining a guide opening, a fulcrum element supported in said guide opening for sliding movement transverse to the axis of one of said shift rails and for rotational movement in a plane including said axis, a shaft supported by said fulcrum element for movement therewith and connected with said one shift rail by a pivot pin extending transverse to said axis, said shaft being pivotable about said axis with sliding movement of said fulcrum element for effecting rotational movement of said shift rail, said shaft being rotatable with rotational movement of said fulcrum element for effecting axial movement of said shift rail.

8. The invention according to claim 7, resilient means supported by said frame and engageable with said fulcrum element for centering said shaft in said guide opening.

9. The invention according to claim 7, said shaft defining a bore and a groove communicating with said bore, a clip retained in said groove and extending into said bore, a control rod extendable into said bore and defining a notch engageable by said clip for locking said control rod to said shaft.

10. A transmission shift control mechanism comprising a support having a pair of first guide surfaces straddling a longitudinal axis and a pair of second guide surfaces straddling a perpendicular axis such that said guide surfaces define a guide opening in said support, a pair of resilient elements supported by said first guide surfaces and extending into said guide opening, a fulcrum element in said guide opening and frictionally contacting said second guide surfaces for rotational movement in the plane of said longitudinal axis and for sliding movement along said perpendicular axis, said fulcrum element frictionally contacting said resilient elements when in a central position in said guide opening, and a shift element extending through and movable with said fulcrum element, said shift element adapted for connection to an associated transmission shift rail oriented parallel to said longitudinal axis by a pivot pin oriented parallel to said perpendicular axis.

11. A transmission shift control mechanism comprising a frame, a support element guided by said frame for sliding movement along a first axis and rotational movement in a plane transverse to said first axis, a shaft carried by and movable with said support element, said shaft extending from said support element and having an end portion adapted to engage an associated transmission shift rail along a second axis transverse to and spaced from said first axis, whereby sliding movement of said support element along said first axis causes pivotal movement of said shaft about said second axis adapted to rotate the associated transmission shift rail, and whereby rotational movement of said support element and said shaft in said plane is adapted to move the associated transmission shift rail along said second axis.

12. The invention according to claim 11, said support element guided by said frame for sliding movement along a third axis transverse to said first axis as said support element rotates in said plane.

13. The invention according to claim 11, said shaft defining a bore, a resilient element extending into said bore, a control stick defining a notch, said control stick extending into said bore such that said resilient element engages said notch.

14. The invention according to claim 11, said shaft defining a bore and a pair of grooves communicating with said bore, a spring clip in said grooves and having arms extending into said bore, a control stick having a tapered end adapted to spread said arms as said stick is inserted into said bore and a notch engageable by said arms to lock said stick in said bore.

15. The invention according to claim 14, a cross pin carried by said support element, said tapered end straddling said cross pin when said stick is locked in bore.

16. The invention according to claim 11, said support element being formed from nylon.

17. A transmission shift control mechanism comprising a support having a pair of first guide surfaces straddling a longitudinal axis and a pair of second guide surfaces straddling a perpendicular axis such that said guide surfaces define a guide opening in said support, a pair of resilient elements supported by said first guide surfaces and extending into said guide opening, a fulcrum element in said guide opening and frictionally contacting said second guide surfaces for rotational movement in the plane of said longitudinal axis and for sliding movement along said perpendicular axis, said resilient elements being in contact with said fulcrum element, and a shift element in said support movable with said fulcrum element, said shift element adapted for connection to an associated transmission shift rail.

* * * * *